United States Patent
Aoki et al.

(10) Patent No.: US 7,172,212 B2
(45) Date of Patent: Feb. 6, 2007

(54) VEHICLE OCCUPANT PROTECTION DEVICE

(75) Inventors: Takashi Aoki, Wako (JP); Hirofumi Totsuka, Wako (JP); Yuichi Saito, Hagagun (JP)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 11/231,021

(22) Filed: Sep. 20, 2005

(65) Prior Publication Data

US 2006/0061074 A1    Mar. 23, 2006

(30) Foreign Application Priority Data

Sep. 22, 2004    (JP)    .............................. 2004-275669
Sep. 22, 2004    (JP)    .............................. 2004-275702

(51) Int. Cl.
    *B60R 21/16*    (2006.01)
(52) U.S. Cl. .................................................. 280/730.2
(58) Field of Classification Search ............. 280/730.1, 280/730.2, 801.1
See application file for complete search history.

(56) References Cited

U.S. PATENT DOCUMENTS 6,059,311 A *    5/2000    Wipasuramonton et al. .......................... 280/729

FOREIGN PATENT DOCUMENTS

JP    3510061    5/1998
JP    10315891 A *    12/1998

* cited by examiner

*Primary Examiner*—Faye M. Fleming
(74) *Attorney, Agent, or Firm*—Rankin, Hill, Porter & Clark LLP

(57) ABSTRACT

An occupant protection device is provided which includes a roof side airbag mounted to a roof side rail of a vehicle to be inflated and deployed along the insides of side glasses by gas generated by an inflator. A slit is formed in a seatbelt interfering area of the roof side airbag which is interfered with by a seatbelt when the roof side airbag inflates and deploys. When the roof side airbag is inflated and deployed, the seatbelt enters the slit, dividing the interfering area into two parts.

5 Claims, 7 Drawing Sheets

VEHICLE OCCUPANT PROTECTION DEVICE

FIELD OF THE INVENTION

The present invention relates to an improvement in occupant protection devices configured to reinforce protection of occupants when the side of a vehicle is subjected to an impact force.

BACKGROUND OF THE INVENTION

In recent years, developments have been made for improving protection performance especially for the heads of occupants when the side of a vehicle is subjected to an impact force.

Japanese Patent No. 3510061, for example, proposes an occupant protection device configured to store a roof side airbag from a pillar along a roof side edge so that the roof side airbag is inflated in the form of a curtain along side window glasses when an impact force exceeding a certain level is applied.

The occupant protection device is configured such that the roof side airbag is stored in a pillar space and a roof space; an inflator is mounted to a roof side rail; the roof side airbag is mounted to the roof side rail by bolts at certain pitches; and the roof side airbag is connected to the inflator via a gas supply pipe. With this occupant protection device, when a sensor detects an impact force above a certain level applied laterally of the vehicle body, the inflator generates gas to inflate the roof side airbag along the side glasses toward the passenger compartment.

In this occupant protection device, however, when the roof side airbag, which is a one-piece bag across the entire longitudinal length of the vehicle, inflates, it deploys also to a seatbelt area, and can be hindered from deploying by a seatbelt. More specifically, there is a problem that when a three-point seatbelt device, which is fastened at a shoulder point, a waist point and an opposite waist point, is mounted to a pillar such as a center pillar, and a seatbelt is drawn out from a through ring disposed above the shoulder of an occupant to be worn by the occupant, for example, the roof side airbag located above the shoulder is in a position to interfere with the seatbelt when inflating and deploying, and the roof side airbag cannot deploy smoothly.

For proper inflation and deployment of the roof side airbag, straps are attached to front and rear end portions of the airbag. The straps are attached to brackets mounted to the vehicle body to maintain the tension of the airbag. In the related art, however, attachment of the straps to the brackets is done without regard to the movement of the roof side airbag during inflation and deployment. Specifically, a strap mounting hole formed in each bracket is a rectangular elongate hole, and has caused the problem of hindering the movement of the strap or causing the strap to be caught between the vehicle body and the bracket and preventing the strap from moving, leaving room for improvement.

SUMMARY OF THE INVENTION

The present invention provides a vehicle occupant protection device which comprises: an inflator for generating gas; a roof side airbag mounted to a roof side rail between a front pillar and a rear pillar of a vehicle, to be inflated and deployed by the gas along the insides of side glasses of the vehicle; and a seatbelt which interferes with the roof side airbag when the airbag inflates and deploys; wherein the roof side airbag includes a seatbelt interfering area to interfere with the seatbelt; the interfering area is formed with a slit which the seatbelt enters when the roof side airbag inflates and deploys; and the interfering area is divided into two parts by the slit when the roof side airbag inflates and deploys.

In the occupant protection device of the present invention, since the slit is formed in the seatbelt interfering area of the roof side airbag, the seatbelt worn in advance by an occupant enters the slit when the roof side airbag inflates and deploys. Consequently, the roof side airbag smoothly inflates and deploys without being hindered by the seatbelt.

The slit preferably includes a torn portion formed in a rear end portion of the slit to be torn when the roof side airbag inflates and deploys. When the roof side airbag inflates and deploys, the torn portion presses on the seatbelt so that the torn portion is torn, and the seatbelt enters the slit. Therefore, even if the rear end portion of the slit is closed, the inflation and deployment of the roof side airbag is not hindered by the seatbelt, and the airbag can deploy smoothly. Also, since the slit has the torn portion which is not open when the roof side airbag is folded into a spiral shape, the airbag can be handled like an airbag without a slit, resulting in an easy folding operation of the airbag.

The roof side airbag preferably has a rear portion including the seatbelt interfering area to interfere with the seatbelt.

The slit formed in the interfering area preferably extends forward of the vehicle from a rear end portion of the interfering area.

The roof side airbag is preferably provided with strap fixing brackets to which strap bodies are connected to provide tension to front and rear portions of the roof side airbag when the roof side airbag inflates and deploys; and the strap fixing brackets each include a round hole formed for hooking the strap bodies thereto, and are disposed with a space between the brackets and a vehicle body of the vehicle so that the strap bodies can move therebetween.

Consequently, with the inflating and deploying movement of the roof side airbag, the strap bodies can move through the round holes relative to the strap fixing brackets. Also, since a space is formed between the vehicle body and the strap fixing brackets, the strap bodies are prevented from being caught between the vehicle body and the strap fixing brackets, and can move smoothly when the roof side airbag inflates and deploys.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
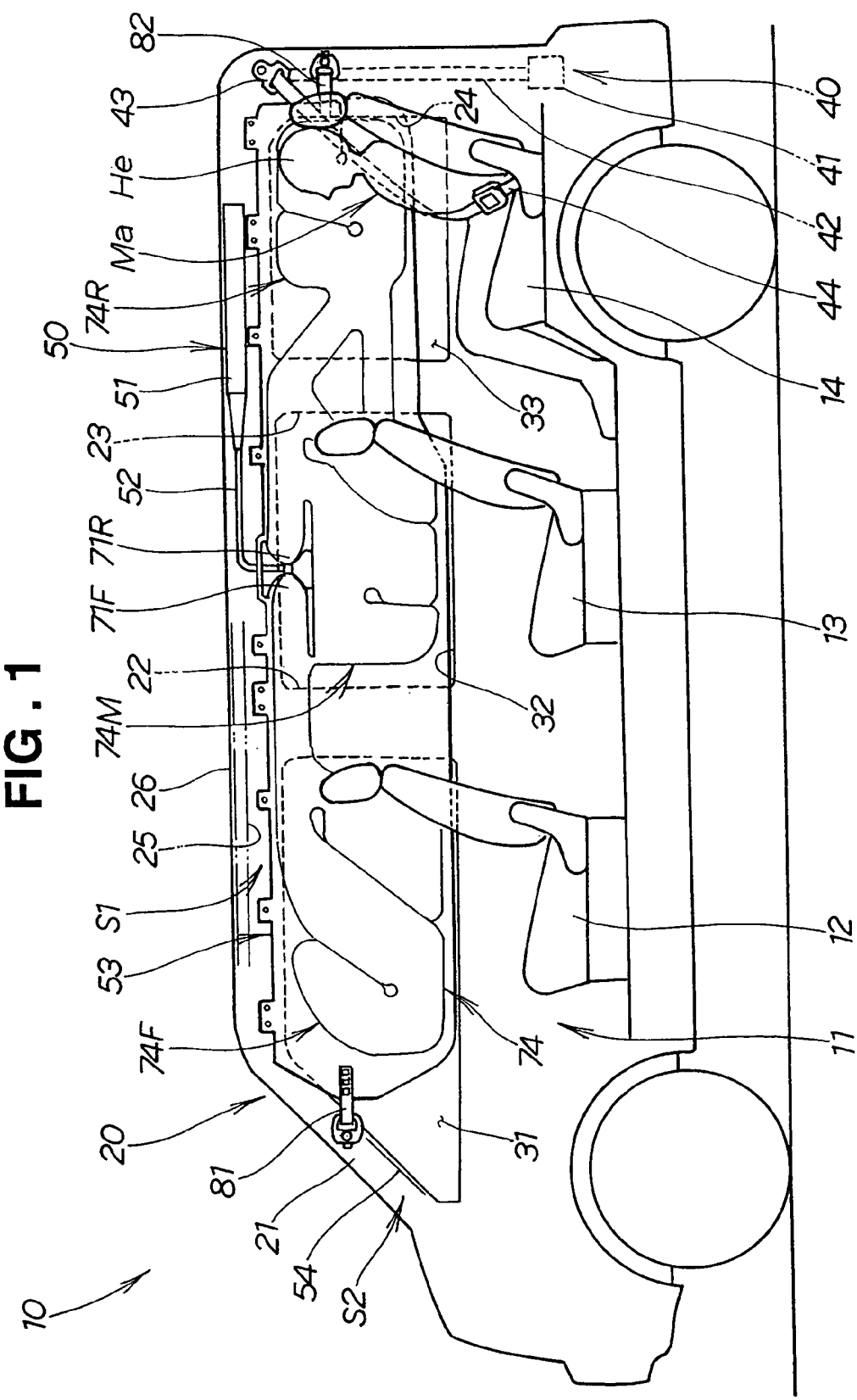
FIG. 1 is a schematic diagram of a vehicle provided with an occupant protection device according to the present invention.

FIG. 1 shows a vehicle 10 provided with an occupant protection device 50. Actually, the occupant protection device 50 is provided on each side of a passenger compartment 11. The right and left occupant protection devices 50 have the same construction. Therefore, in this embodiment, only the occupant protection device 50 disposed on the right side of the vehicle 10 will be described, and description of the left-side occupant protection device 50 will be omitted.

The vehicle 10 shown in FIG. 1 is a station wagon with three rows of seats including a front seat 12, a middle seat 13 and a rear seat 14 in the passenger compartment 11. A vehicle body 20 includes a front pillar 21, a rear pillar 24, and a forward middle pillar 22 and a rearward middle pillar 23 provided therebetween. A roof side rail 25 is provided across the upper ends of the pillars 21, 22, 23 and 24. A roof 26 is supported by the roof side rail 25. A front side glass 31, a middle side glass 32 and a rear side glass 33 are provided between the pillars 21, 22, 23 and 24.

An occupant Ma seated in the rightmost area of the rear seat 14 is restrained by a seatbelt device 40. The seatbelt device 40 includes a seatbelt 42 wound in a retractor 41 to be pulled out and put through a through ring 43 and then hooked to a lower anchor 44. The retractor 41 is a belt winder mounted to a lower portion of the rear pillar 24. The through ring 43 is a member mounted to an upper portion of the rear pillar 24. The lower anchor 44 is attached to a side portion of the cushion of the rear seat 14. The seatbelt 42 restrains the upper body and the waist of the occupant Ma.

The occupant protection device 50 detects an impact force exceeding a certain level applied to the side of the vehicle 10 with an impact detection sensor (not shown). According to the sensor signal, an inflator 51 generates gas. The gas is supplied through a supply pipe 52 into a roof side airbag 53, so that the roof side airbag 53 inflates along the side glasses 31, 32 and 33 toward the passenger compartment 11.

The roof side airbag 53 inflated and deployed into the passenger compartment 11 covers the side glasses 31 to 33, protecting especially the heads He of occupants Ma seated in the seats 12 to 14.

Figure 2:
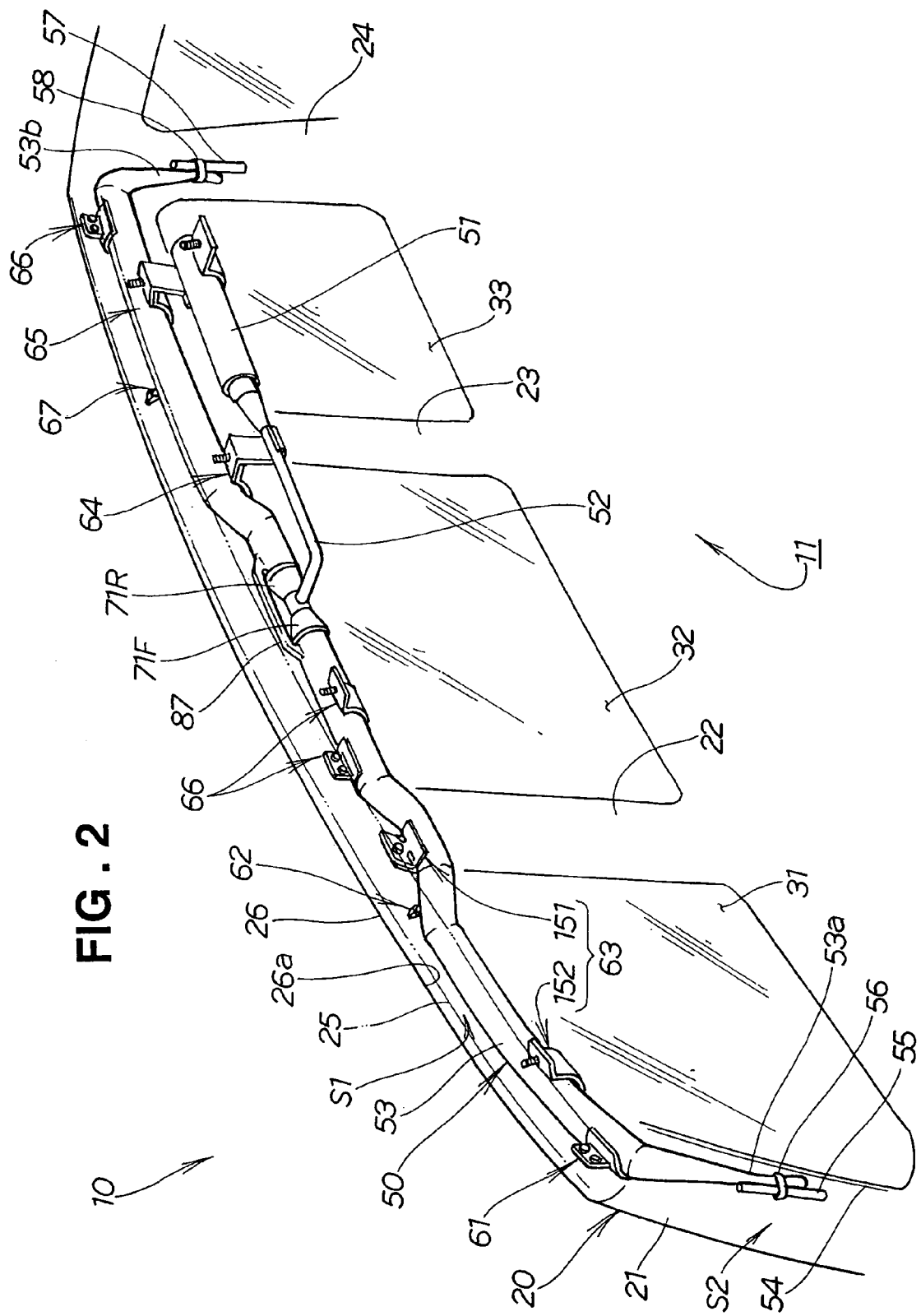
FIG. 2 is a perspective view of the occupant protection device mounted to a roof side rail.

As shown in FIGS. 1 and 2, the supply pipe 52 is a gas pipe to supply gas from the inflator 51 to the roof side airbag 53. The inflator 51 and the supply pipe 52 are extended longitudinally and disposed in parallel with the roof side airbag 53.

The vehicle body 20 includes a longitudinally elongated certain roof space S1 (space S1) at a side corner 26a of the roof 26 on the passenger compartment 11 side. The inflator 51, the supply pipe 52 and the roof side airbag 53 are placed in the roof space S1.

A pillar garnish 54 is mounted to the passenger compartment 11 side of the front pillar 21 provided at the front of the vehicle body 20, with a certain pillar space S2 therebetween. A front portion of the roof side airbag 53 is placed in the pillar space S2.

A front end portion 53a of the roof side airbag 53 is secured to the front pillar 21 by a fastening member 56 such as a band via a bracket 55. A rear end portion 53b of the roof side airbag 53 is secured to the rear pillar 24 by a fastening member 58 such as a band via a bracket 57. The occupant protection device 50 is mounted to the roof side rail 25 by a protector cloth mounting structure 61, an airbag fastening structure 62, a mounting bracket structure 63, and various types of fixing mechanisms 64, 65, 66, 66, 67.

The mounting bracket structure 63 includes a first mounting bracket 151 and a second mounting bracket 152.

Figure 3:
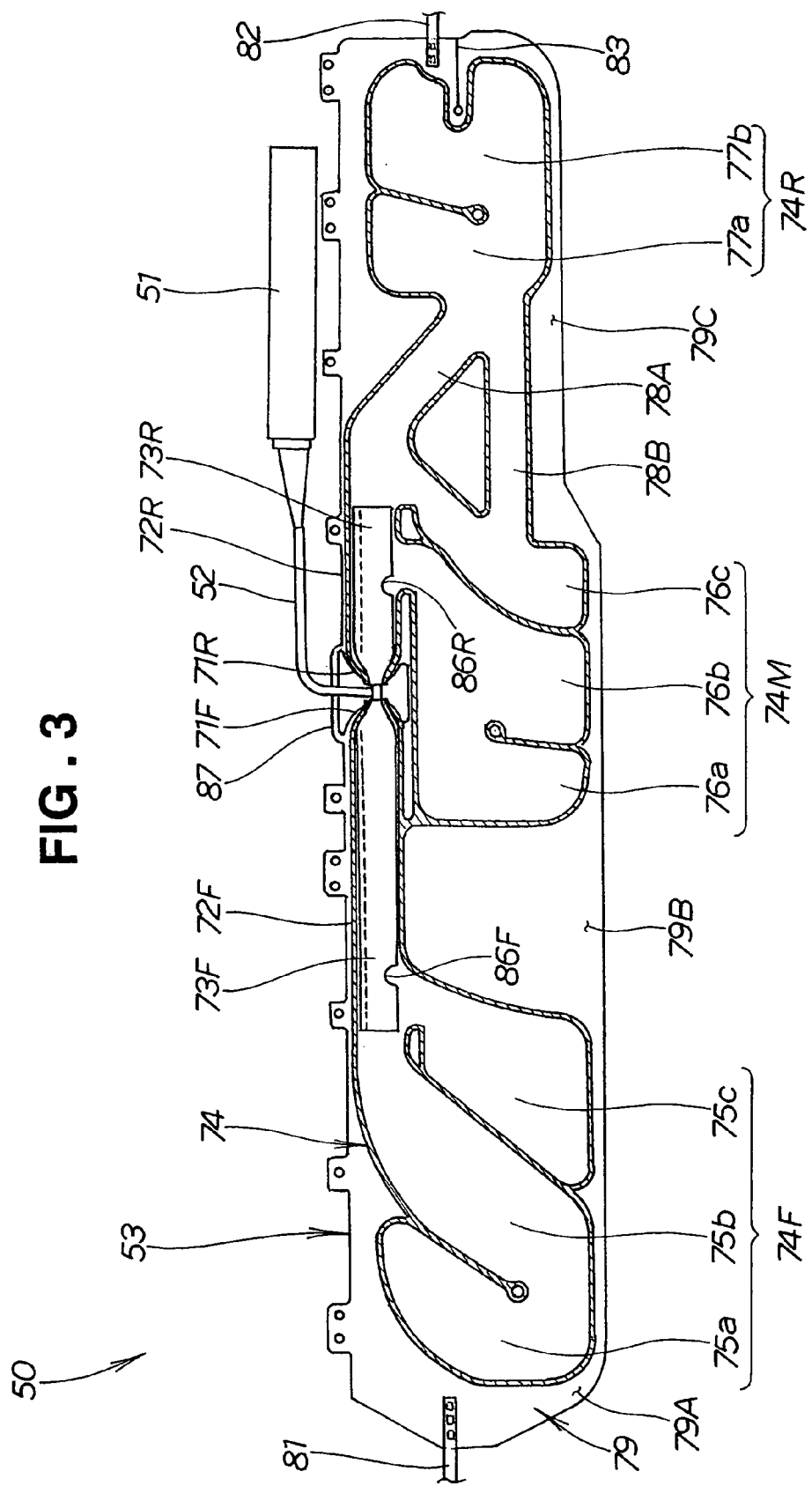
FIG. 3 is a diagram of the occupant protection device with a deployed roof side airbag shown in cross section.

As shown in FIGS. 1 and 3, the roof side airbag 53 includes an inflating portion 74 made from a flexible sheet such as an airtight cloth, and a non-inflating portion 79 made from cloth.

The inflating portion 74 of the roof side airbag 53 includes, in one piece, two front and rear gas inlets 71F, 71R, two front and rear gas main passages 72F, 72R, two front and rear inner tubes 73F, 73R, and a front bag portion 74F, a middle bag portion 74M and a rear bag portion 74R.

The two front and rear gas inlets 71F, 71R are disposed in a longitudinally substantially middle portion.

The two front and rear gas main passages 72F, 72R are extended longitudinally from the gas inlets 71F, 71R along the roof space S1.

The two front and rear inner tubes 73F, 73R are individually passed through the gas main passages 72F, 72R, and individually communicate with the two front and rear gas inlets 71F, 71R at one ends thereof.

The front bag portion 74F communicates with the front inner tube 73F through the front gas main passage 72F, and inflates in a position corresponding to the front seat 12.

The middle bag portion 74M communicates with the rear inner tube 73R through the rear gas main passage 72R, and inflates in a position corresponding to the middle seat 13.

The rear bag portion 74R communicates with the rear inner tube 73R through the rear gas main passage 72R, and inflates in a position corresponding to the rear seat 14.

The front bag portion 74F includes three longitudinally adjacent inflating portions 75a, 75b and 75c so that when the front bag portion 74F inflates along the front side glass 31 toward the passenger compartment 11, gas flowing from the front gas main passage 72F into the front bag portion 74F heads downward and then flows forward and upward in a turning direction.

These inflating portions 75a, 75b and 75c constitute a front inflating portion 75a, a middle inflating portion 75b and a rear inflating portion 75c, arranged in line. The front inflating portion 75a and the middle inflating portion 75b communicate with each other, and the middle inflating portion 75b and the rear inflating portion 75c communicate with each other.

In the front bag portion 74F, the middle inflating portion 75b has an opening at an upper end disposed near the front end of the front gas main passage 72F for communication therewith, and a front lower end communicating with an opening at a rear lower end of the front inflating portion 75a. The front inflating portion 75a has an opening only at the rear lower end. The rear inflating portion 75c has an opening at an upper end disposed near the front end of the front gas main passage 72F for communication therewith.

The middle bag portion 74M includes three longitudinally adjacent inflating portions 76a, 76b and 76c aligned below the two front and rear gas inlets 71F, 71R. These inflating potions 76a, 76b and 76c constitute a front inflating portion 76a, a middle inflating portion 76b, and a rear inflating portion 76c, arranged in line. The front inflating portion 76a and the middle inflating portion 76b communicate with each other, and the middle inflating portion 76b and the rear inflating portion 76c communicate with each other.

The middle inflating portion 76b has an opening at a rear upper end disposed near the rear end of the rear gas main passage 72R for communication therewith, and a front upper end communicating with an opening at a rear upper end of the front inflating portion 76a. The front inflating portion 76a has an opening only at the rear upper end. The rear inflating portion 76c has an opening at an upper end disposed near the rear end of the rear gas main passage 72R for communication therewith.

The rear bag portion 74R includes two front and rear inflating portions 77a, 77b aligned rearward of the rear gas main passage 72R. These inflating portions 77a, 77b constitute a front inflating portion 77a and a rear inflating portion 77b, arranged in line.

The front inflating portion 77a has an opening at a front lower end communicating with the rear end of the rear gas main passage 72R through an upper communicating tube 78A and also communicating with a rear opening of the rear inflating portion 76c of the middle bag portion 74M through a lower communicating tube 78B.

The rear inflating portion 77b has an opening at a front lower end communicating with an opening at a rear lower end of the front inflating portion 77a.

The roof side airbag 53 is integrally provided with the non-inflating portion 79 around the bag portions 74F, 74M and 74R. The non-inflating portion 79 includes a front non-inflating portion 79A, a middle non-inflating portion 79B, and a rear non-inflating portion 79C.

The front non-inflating portion 79A is provided with a front strap 81 in the form of a string or band. The rear non-inflating portion 79C is provided with a rear strap 82 in the form of a string or band, and a slit 83.

In FIG. 3, reference numerals 86F, 86R denote discharge holes formed in the two front and rear inner tubes 73F, 73R, respectively.

Figure 4:
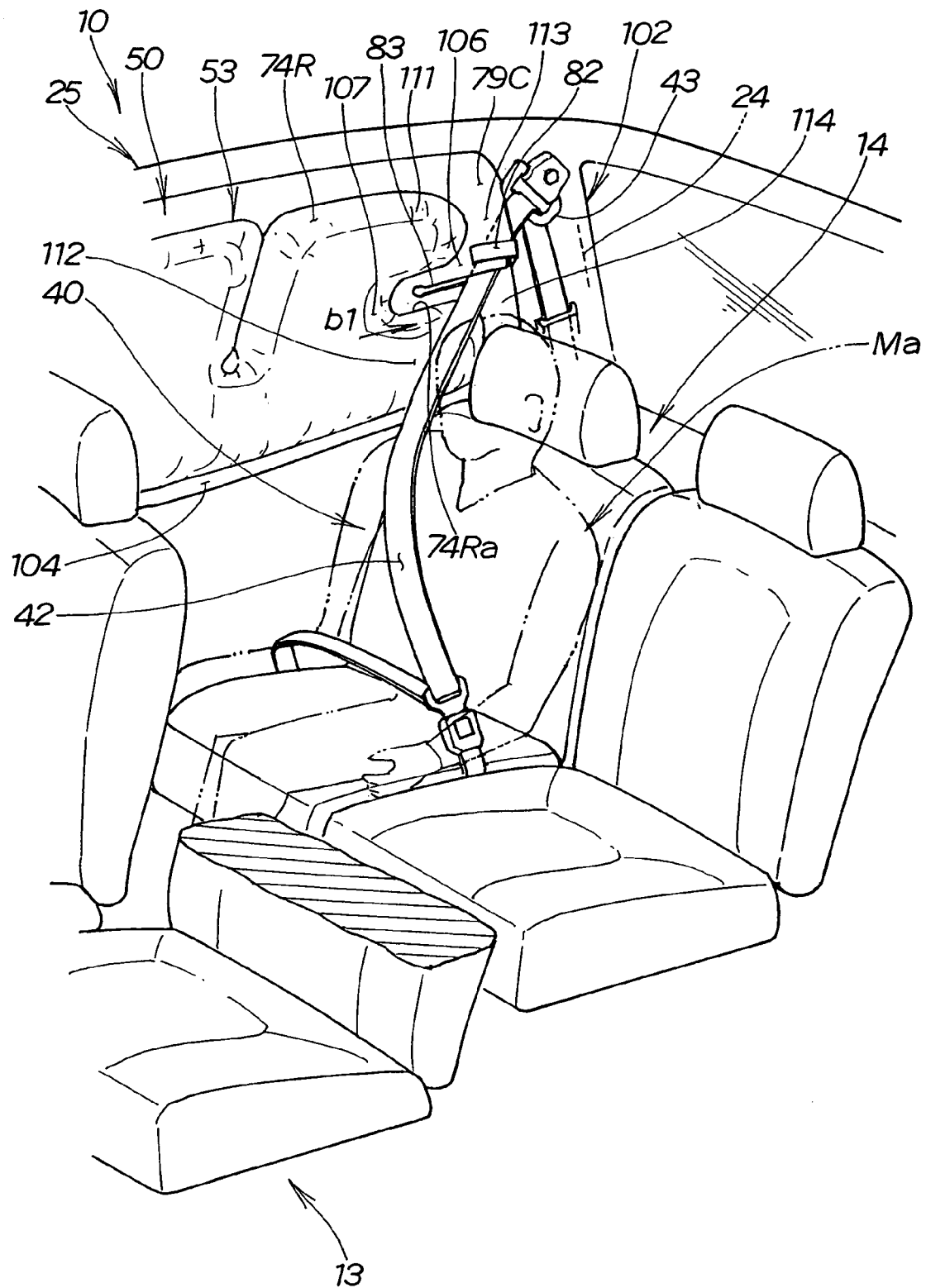
FIG. 4 is a perspective view showing the relationship between the occupant protection device of the present invention and a seatbelt device.

FIG. 4 shows the relationship between the roof side airbag 53 and the seatbelt 42.

A depressed portion 74Ra extending a given length forward from the rear end of the rear bag portion 74R is formed in a vertically substantially middle portion of the rear bag portion 74R of the roof side airbag 53. The depressed portion 74Ra serves to prevent interference between the rear bag portion 74R and the seatbelt 42 when the roof side airbag 53 inflates and deploys.

A slit 83 is formed in the rear non-inflating portion 79C at a position corresponding to the depressed portion 74R in a seatbelt interfering area 106 where the rear non-inflating portion 79C interferes with the seatbelt 42 when the roof side airbag 53 inflates and deploys. The seatbelt 42 enters the slit 83 as shown by arrow b1 when the roof side airbag 53 inflates and deploys.

The rear bag portion 74R is divided by the slit 83 and the depressed portion 74Ra into a first divided bag portion 111 and a second divided bag portion 112 above and below with a middle portion 107 thereof, or the depressed portion 74Ra as the boundary. Also, the rear non-inflating portion 79C is divided into a first divided non-inflating portion 113 and a second divided non-inflating portion 114 above and below with the slit 83 as the boundary.

Next, the configuration of the slit 83 and the condition of the slit 83 during inflation and deployment of the roof side airbag 53 will be described with reference to FIGS. 5A and 5B.

Figure 5A:
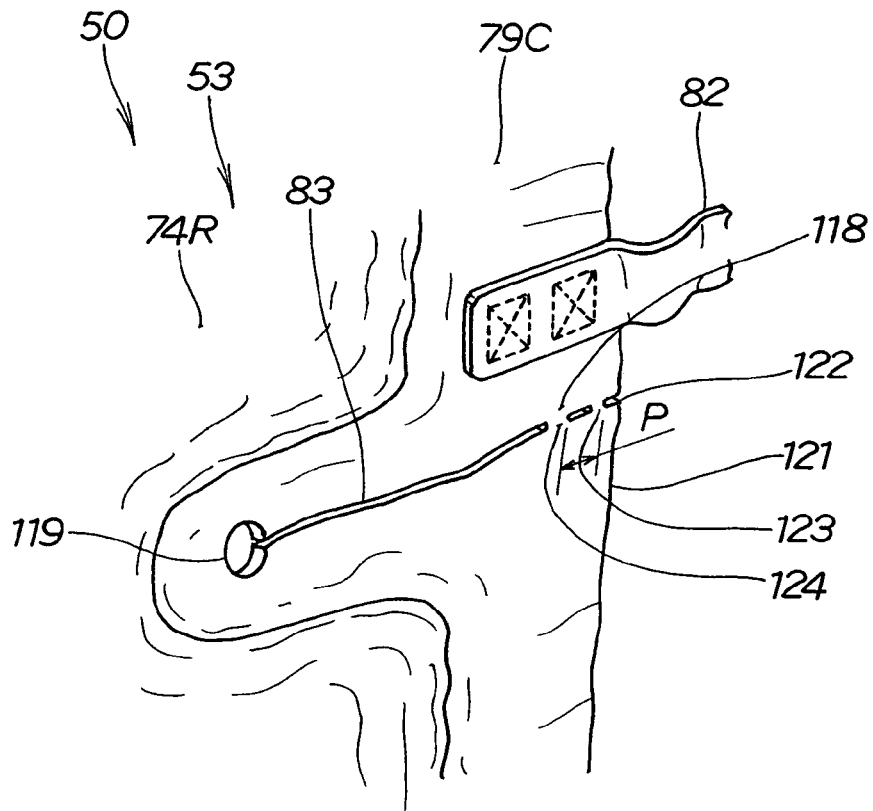
FIGS. 5A and 5B are diagrams showing a slit shown in FIG. 4 being torn.

Referring to FIG. 5A, a torn portion 118 to be torn when the roof side airbag 53 inflates and deploys is formed at a rear end portion of the rear non-inflating portion 79C, continuously with the slit 83. Reference numeral 119 denotes a stopping portion formed in the slit 83 opposite to the torn portion 118.

The torn portion 118 includes a notch 122 formed in a rear end 121 of the rear non-inflating portion 79C, a first joint 123 formed continuously with the notch 122, and a second joint 124 formed at a distance of pitch P from the first joint 123. The first and second joints 123 and 124 may have any desired length, and have any desired pitch P therebetween. Also, the number of joints may be any desired one. Further, for the joints, an adhesive or a thread can be used to form the torn portion 118.

Figure 5B:
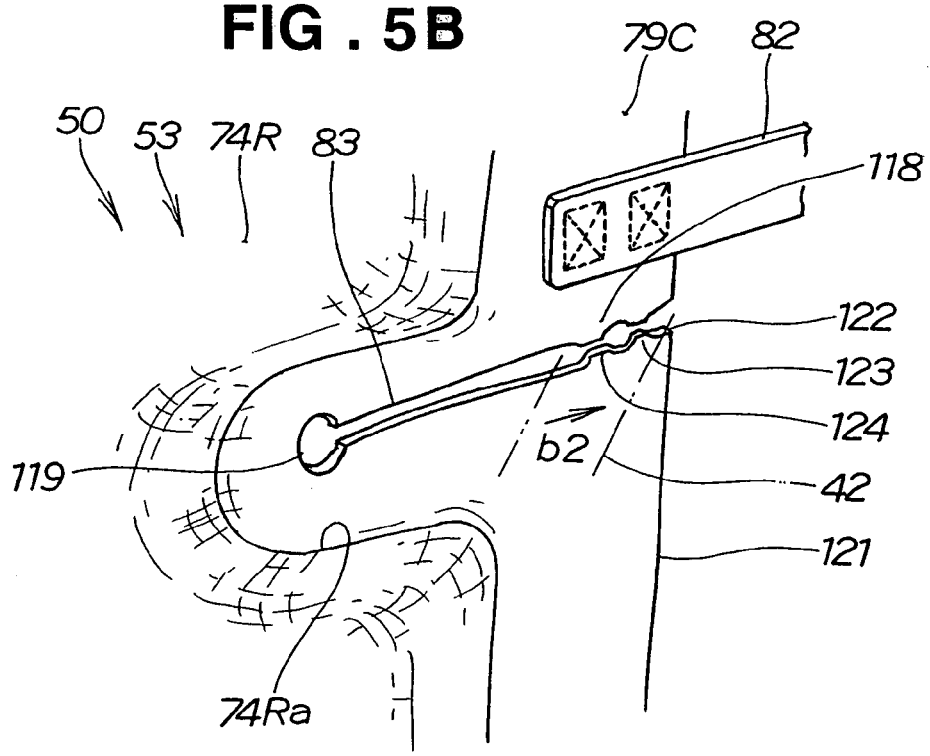

As shown in FIG. 5B, when the roof side airbag 53 inflates and deploys, the torn portion 118 in the slit 83 hits the seatbelt 42. Consequently, the torn portion 118 breaks, and the seatbelt 42 enters the slit 83 as shown in FIG. 4.

More specifically, when the roof side airbag 53 inflates and deploys, the torn portion 118 formed in the rear non-inflating portion 79C hits the seatbelt 42 as shown by arrow b2, causing a pressing force applied to the first joint 123 through the notch 122, whereby the first joint 123 is torn, and successively, the second joint 124 is torn.

As described above, in the occupant protection device 50 of the present invention, a rear portion of the roof side airbag 53 has the slit 83, and the rear portion of the airbag 53 is divided into two parts by the slit 83, so that the airbag 53 is not hindered from deploying by the seatbelt 42, and can deploy smoothly.

The slit 83 has the torn portion 118 to break only when the roof side airbag 53 inflates and deploys, and the torn portion 118 is not normally torn. This facilitates handling of the roof side airbag 53 when rolling it in a spiral shape.

In the embodiment shown in the figures, the slit 83 is exemplarily formed in the rear portion of the roof side airbag 53, or the rear non-inflating portion 79C, extending forward from the rear end portion, but it may alternatively be formed obliquely or vertically. For example, it may be formed vertically in the middle non-inflating portion 79B shown in FIG. 3.

Figure 6A:
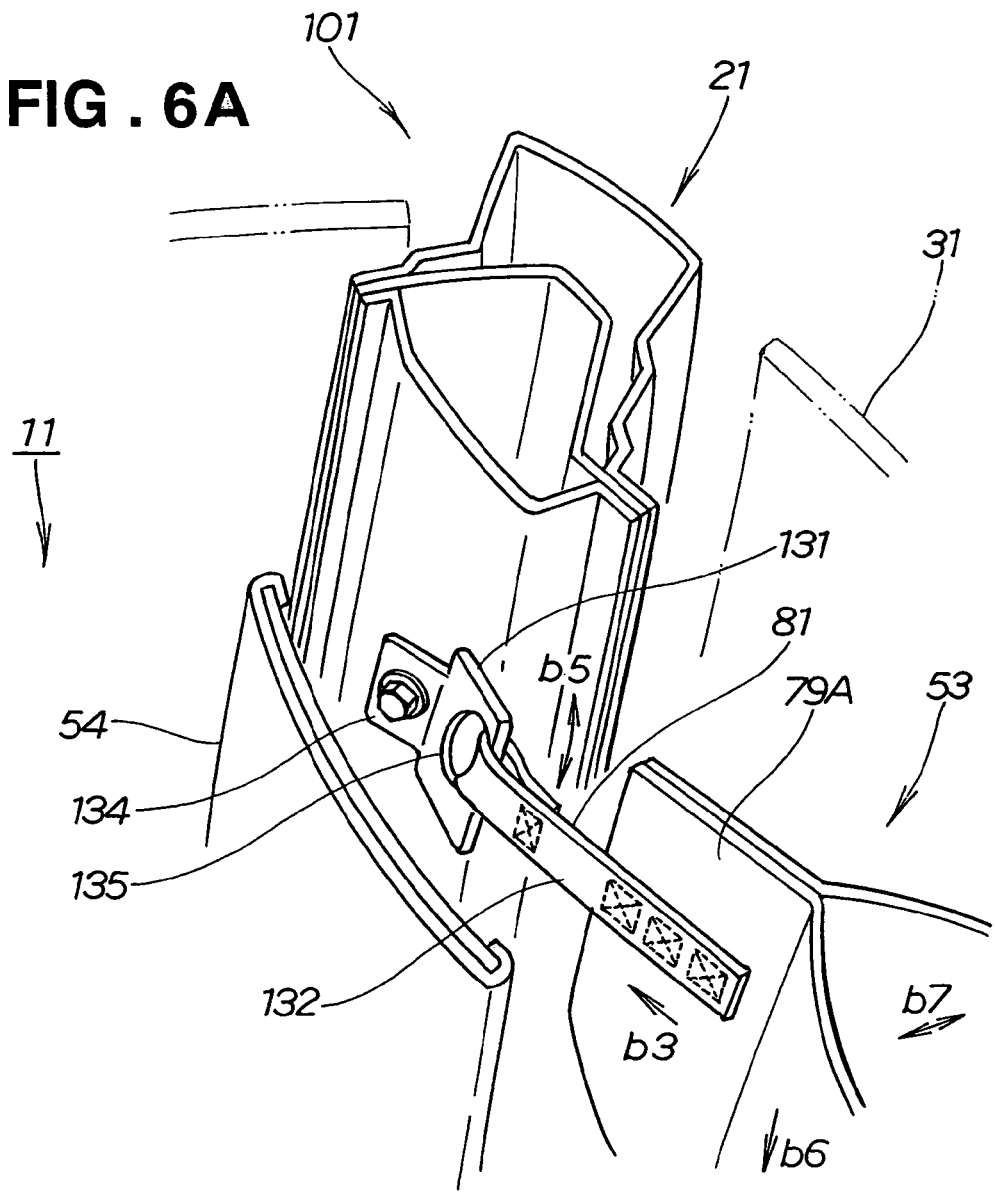
FIGS. 6A and 6B are perspective views of a front strap mounting structure.
Figure 6B:
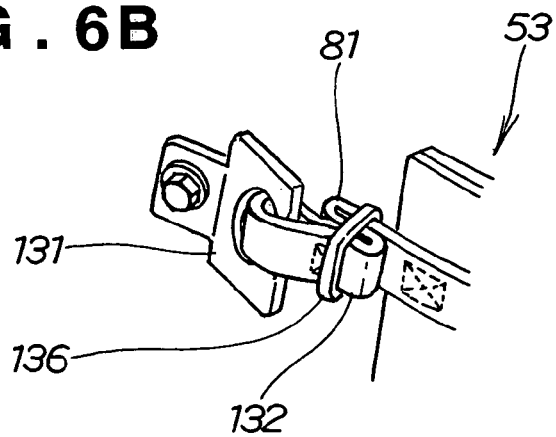

FIGS. 6A and 6B show a front pillar structure 101.

The front pillar structure 101 includes the front pillar 21 and the front pillar garnish 54 mounted to the passenger compartment 11 side of the front pillar 21.

The front strap 81 includes a front strap fixing bracket 131 mounted to the front pillar 21, and a strap body 132 connected to the front strap fixing bracket 131. The front strap 81 provides tension to the front non-inflating portion 79A in the direction shown by arrow b3 to stretch the roof side airbag 53 longitudinally when the roof side airbag 53 inflates and deploys.

The front strap fixing bracket 131 includes a mounting portion 134 to be attached to the front pillar 21, and a round hole 135 formed for hooking one end portion of the strap body 132 thereto. The one end portion of the strap body 132 is put through the round hole 135 and folded back. The folded-back one end portion is sewn to the strap body 132, for example. The other end portion of the strap body 132 is sewn to the front non-inflating portion 79A, for example.

The round hole 135 may be elliptical. Consequently, the strap body 132 can move in the directions of arrow b5 relative to the round hole 135.

When the roof side airbag 53 is rolled and folded in a spiral shape, the strap body 132 is folded as necessary as shown in FIG. 6B and held in that condition with a tape 136.

The round hole 135 formed in the front strap fixing bracket 131 allows the strap body 132 to move as shown by arrow b5 in conjunction with the inflating and deploying movement of the roof side airbag 53 when inflating and deploying as shown by arrows b6 and b7, and allows the bracket 131 to hold the strap body 132 in stable condition.

Figure 7:
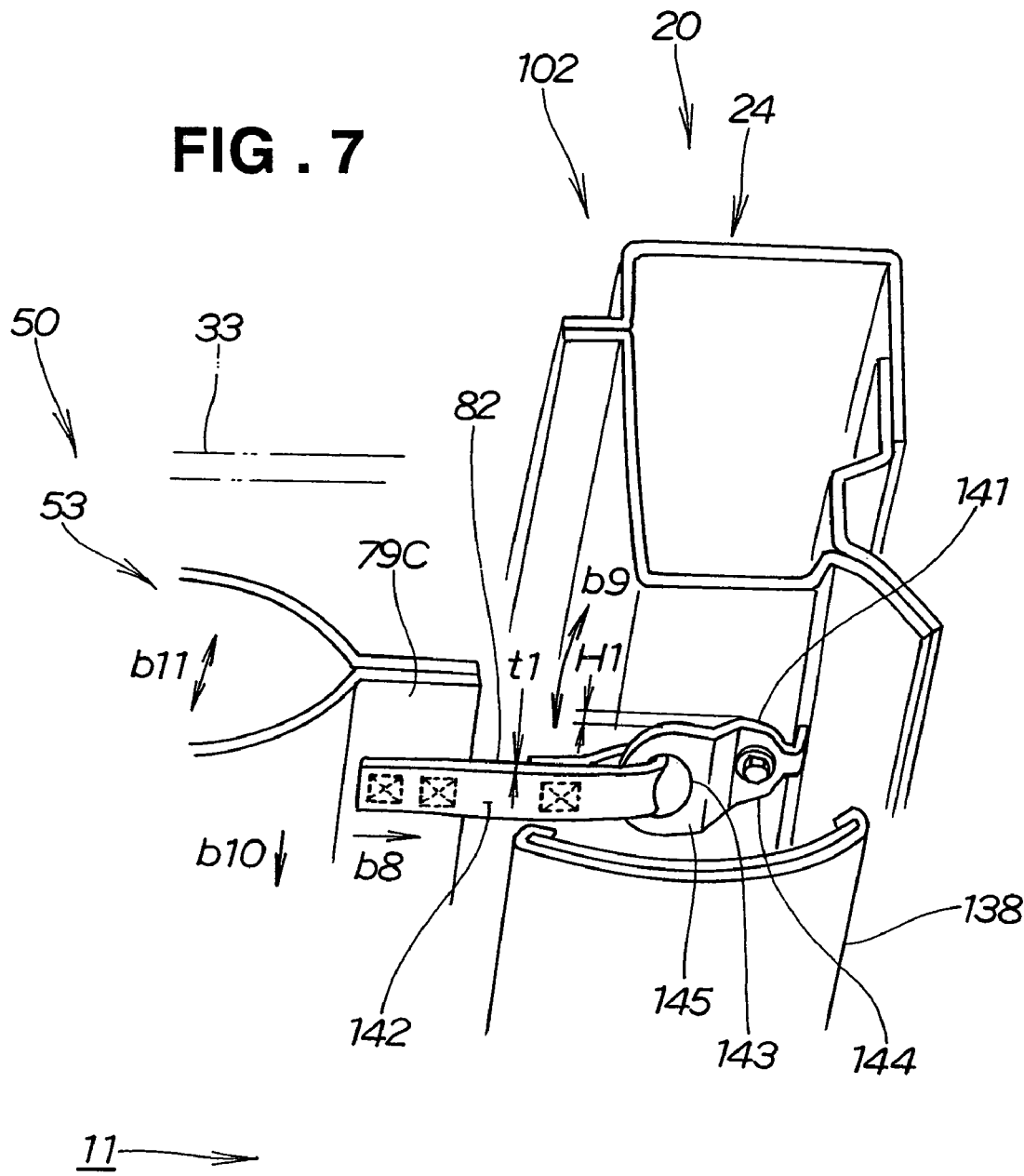
FIG. 7 is a perspective view of a rear strap mounting structure.

FIG. 7 shows a rear pillar structure 102.

The rear pillar structure 102 includes the rear pillar 25 and a rear pillar garnish 138 mounted to the passenger compartment 11 side of the rear pillar 24.

The rear strap 82 includes a rear strap fixing bracket 141 mounted to the rear pillar 25, and a strap body 142 connected to the rear strap fixing bracket 141. When the roof side airbag 53 inflates and deploys, the rear strap 82 provides tension to the rear non-inflating portion 79C in the direction shown by arrow b8 to stretch the roof side airbag 53 longitudinally in cooperation with the front strap 81 shown in FIGS. 6A and 6B.

The rear strap fixing bracket 141 includes a mounting portion 144 to be attached to the rear pillar 24, and a strap mounting portion 145 formed with a round hole 143 for hooking one end portion of the strap body 142 thereto. The one end portion of the strap body 142 is put through the round hole 135 and folded back, and the folded-back one end portion is sewn to the strap body 142, for example. The other end portion of the strap body 142 is sewn to the rear non-inflating portion 79C, for example.

The strap mounting portion 145 is integrally formed with the mounting portion 144, and has a step to be distanced a distance H1 from the mounting portion 144 (or the rear pillar 24). The distance H1 is a space greater than the thickness t1 of the strap body 142 so that the strap body 142 hooked to the round hole 143 can move as shown by arrow b9 without interfering with the rear pillar 24. The round hole 143 may be elliptical.

The strap body 142 is folded as necessary like the strap body 132 as shown in FIG. 6B, and held with a tape 136.

As described above, the rear strap fixing bracket 141 having the round hole 143 for hooking the strap body 142 thereto is mounted to the rear pillar 24 with a space between the bracket 141 and the vehicle body 20 (rear pillar 24) so that the strap body 142 can move therebetween. Consequently, when the roof side airbag 53 inflates and deploys as shown by arrows b10 and b11, the strap body 142 can easily move as shown by arrow b9 along the round hole 143 in conjunction with the inflating and deploying movement.

Also, since the rear strap fixing bracket 141 is mounted to the rear pillar 24 with a space therebetween, the strap body 142 is prevented from being caught between the rear pillar 24 and the rear strap fixing bracket 141, and can move smoothly when the roof side airbag 53 inflates and deploys.

As described above, when the roof side airbag 53 is rolled and folded in a spiral shape, the strap bodies 132 and 142 are folded and held with the tapes 136. This can absorb the difference between the length required when the roof side airbag 53 is folded and the length required during inflation and deployment, and can fulfill easiness of mounting to the vehicle body 20 and both the functions required in inflation and deployment.

Although this embodiment has been described with an example of applying the occupant protection device 50 to a vehicle with three rows of seats, the present invention is also applicable to vehicles with two or four rows of seats.

Obviously, various minor changes and modifications of the present invention are possible in the light of the above teaching. It is therefore to be understood that within the scope of the appended claims the invention may be practiced otherwise than as specifically described.

What is claimed is:

1. A vehicle occupant protection device comprising:
an inflator for generating gas;
a roof side airbag mounted to a roof side rail between a front pillar and a rear pillar of a vehicle, to be inflated and deployed by the gas along the insides of side glasses of the vehicle; and
a seatbelt which interferes with the roof side airbag when the airbag inflates and deploys,
wherein the roof side airbag includes a seatbelt interfering area to interfere with the seatbelt, the interfering area is formed with a slit which the seatbelt enters when the roof side airbag inflates and deploys, and the interfering area is divided into two parts by the slit when the roof side airbag inflates and deploys.

2. An occupant protection device as set forth in claim 1, wherein the slit includes a torn portion formed in a rear end portion of the slit to be torn when the roof side airbag inflates and deploys.

3. An occupant protection device as set forth in claim 1, wherein the roof side airbag has a rear portion including the seatbelt interfering area to interfere with the seatbelt.

4. An occupant protection device as set forth in claim 1, wherein the slit formed in the interfering area extends forward of the vehicle from a rear end portion of the interfering area.

5. An occupant protection device as set forth in claim 1, wherein the roof side airbag is provided with strap fixing brackets to which strap bodies are connected to provide tension to front and rear portions of the roof side airbag when the roof side airbag is inflates and deploys; and the strap fixing brackets each include a round hole formed for hooking the strap bodies thereto, and are disposed with a space between the brackets and a vehicle body of the vehicle so that the strap bodies can move therebetween.

* * * * *